(12) United States Patent
Okubo

(10) Patent No.: US 8,037,875 B2
(45) Date of Patent: Oct. 18, 2011

(54) CONTROL APPARATUS AND CONTROL METHOD FOR INTERNAL COMBUSTION ENGINE

(75) Inventor: Naoya Okubo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 383 days.

(21) Appl. No.: 12/437,926

(22) Filed: May 8, 2009

(65) Prior Publication Data

US 2009/0283078 A1   Nov. 19, 2009

(30) Foreign Application Priority Data

May 15, 2008   (JP) .................................. 2008-128480

(51) Int. Cl.
*F02B 43/00* (2006.01)
*F02B 13/00* (2006.01)
*F02B 77/08* (2006.01)

(52) U.S. Cl. ...................... 123/575; 123/1 A; 123/198 D

(58) Field of Classification Search .................. 123/1 A, 123/2, 575–578, 198 D; 701/103
See application file for complete search history.

(56) References Cited

FOREIGN PATENT DOCUMENTS

| JP | 5-60003 | 3/1993 |
|----|---------|--------|
| JP | 6-6216 | 2/1994 |
| JP | 6-6218 | 2/1994 |
| JP | 6-34599 | 9/1994 |
| JP | 7-43645 | 10/1995 |
| JP | 8-10670 | 3/1996 |

*Primary Examiner* — Noah Kamen
(74) *Attorney, Agent, or Firm* — Oblon, Spivak, McClelland, Maier & Neustadt, L.L.P.

(57) ABSTRACT

A control apparatus for an internal combustion engine includes a first fuel tank where a first fuel containing alcohol is stored; a second fuel tank where a second fuel is stored, wherein a concentration of alcohol in the second fuel is known; an alcohol concentration sensor disposed in a supply passage through which the first and second fuels flow; and a malfunction determination portion. The control apparatus switches a fuel flowing through the supply passage between the first fuel and the second fuel, and controls a fuel injection amount based on a concentration of the alcohol in the first fuel detected by the sensor. The malfunction determination portion determines that the sensor malfunctions, if a value detected by the sensor is outside a predetermined range corresponding to the concentration of the alcohol in the second fuel when the fuel flowing through the supply passage is switched to the second fuel.

14 Claims, 6 Drawing Sheets

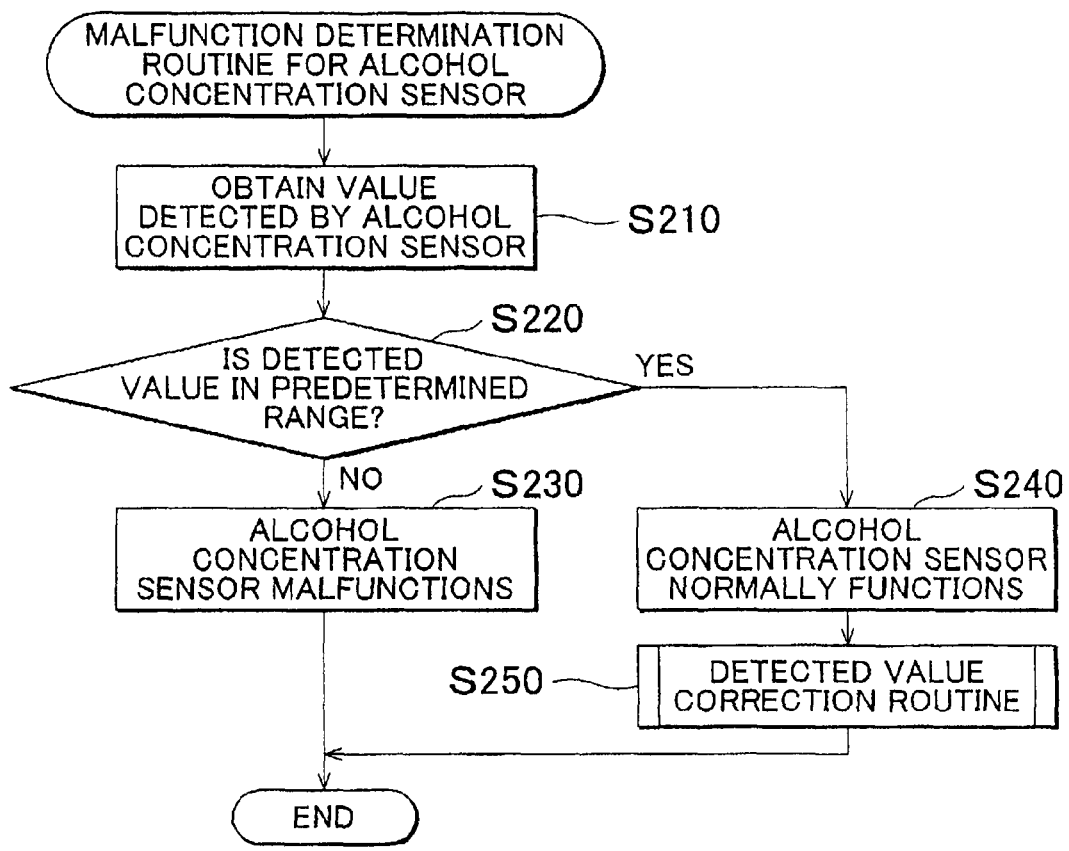
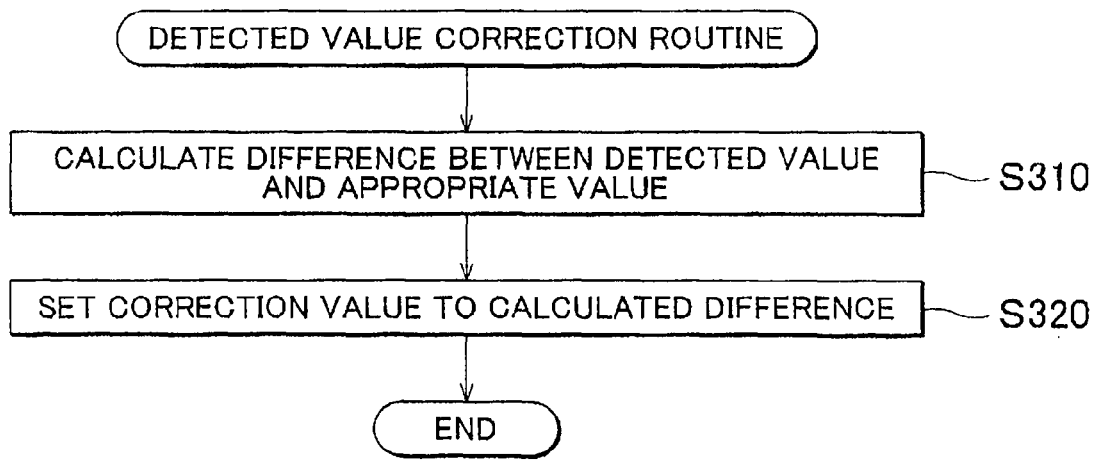

CONTROL APPARATUS AND CONTROL METHOD FOR INTERNAL COMBUSTION ENGINE

INCORPORATION BY REFERENCE

The disclosure of Japanese Patent Application No. 2008-128480 filed on May 15, 2008 including the specification, drawings and abstract is incorporated herein by reference in its entirety.

BACKGROUND OF THE INVENTION

1. Field of the Invention

The invention relates to a control apparatus and a control method for an internal combustion engine that uses a fuel containing an alcohol component.

2. Description of the Related Art

Recently, an internal combustion engine that uses a fuel containing an alcohol component has been put into practical use. The internal combustion engine can be operated using only an alcohol fuel, only a gasoline fuel, or a mixed fuel produced by mixing the alcohol fuel with the gasoline fuel at a given ratio. For example, a main fuel tank and a subsidiary fuel tank are provided, and the alcohol fuel is stored in the main fuel tank and a fuel such as gasoline is stored in the subsidiary fuel tank. When the internal combustion engine is normally operated, the alcohol fuel in the main fuel tank is supplied to the engine. For example, when the internal combustion engine is started, the fuel in the subsidiary fuel tank is supplied to the engine.

Because the stoichiometric air-fuel ratio or the amount of heat generated per unit mass varies according to the concentration of alcohol, it is necessary to control a fuel injection amount according to the concentration of alcohol mixed in the fuel. Thus, in an internal combustion engine described in Japanese Utility Model Publication No. 6-6216, an alcohol concentration sensor detects the concentration of alcohol in a fuel supplied to the internal combustion engine, and an air-fuel ratio feedback control is executed based on a value detected by the alcohol concentration sensor, to correct a fuel injection amount so that an air-fuel ratio is close to a target air-fuel ratio.

In the internal combustion engine described in the publication No. 6-6216, when a feedback correction amount in the air-fuel ratio feedback control is maintained at an upper limit value or a lower limit value for a given time or longer, it is determined that the alcohol concentration sensor malfunctions. However, the feedback correction value may vary due to the malfunction of a device other than the alcohol concentration sensor, such as an injector and an airflow meter. Therefore, even if the alcohol concentration sensor does not actually malfunction, it may be erroneously determined that the alcohol concentration sensor malfunctions.

SUMMARY OF THE INVENTION

The invention provides a control apparatus and a control method for an internal combustion engine, which accurately determine whether an alcohol concentration sensor malfunctions, in an internal combustion engine that uses a fuel containing an alcohol component as an engine fuel.

A first aspect of the invention relates to a control apparatus for an internal combustion engine, which includes a first fuel tank in which a first fuel containing alcohol is stored; a second fuel tank in which a second fuel is stored, wherein a concentration of alcohol in the second fuel is known; an alcohol concentration sensor disposed in a supply passage through which the first fuel and the second fuel flow; and a malfunction determination portion. The control apparatus switches a fuel that flows through the supply passage between the first fuel and the second fuel, and controls the internal combustion engine based on a concentration of the alcohol in the first fuel detected by the alcohol concentration sensor. The malfunction determination portion determines that the alcohol concentration sensor malfunctions, if a value detected by the alcohol concentration sensor is outside a predetermined range corresponding to the concentration of the alcohol in the second fuel when the fuel that flows through the supply passage is switched to the second fuel.

In the above-described aspect, the control apparatus may control a fuel injection amount based on the concentration of the alcohol in the first fuel detected by the alcohol concentration sensor.

In the above-described configuration, the concentration of the alcohol in the second fuel stored in the second fuel tank is known; and the malfunction determination portion determines that the alcohol concentration sensor malfunctions, if the value detected by the alcohol concentration sensor is outside the predetermined range corresponding to the concentration of the alcohol in the second fuel when the fuel that flows through the supply passage is switched to the second fuel. Therefore, it is possible to determine whether the alcohol concentration sensor malfunctions, directly based on the value detected by the alcohol concentration sensor. Accordingly, it is possible to more accurately determine whether the alcohol concentration sensor malfunctions. The predetermined range corresponding to the concentration of the alcohol in the second fuel may be set based on the value corresponding to the concentration of the alcohol in the second fuel, taking into account a predetermined error or the like.

The control apparatus according to the above-described aspect may further include a switching device that switches a fuel tank connected to the alcohol concentration sensor between the first fuel tank and the second fuel tank. The switching device may switch the fuel tank connected to the alcohol concentration sensor to the second fuel tank when the internal combustion engine is started, and the switching device may switch the fuel tank connected to the alcohol concentration sensor to the first fuel tank after the internal combustion engine is started.

In the above-described configuration, it is determined whether the alcohol concentration sensor malfunctions when the fuel tank connected to the alcohol concentration sensor is switched to the second fuel tank at the time of start of the internal combustion engine. Therefore, it is possible to determine whether the alcohol concentration sensor malfunctions without the need of connecting the second fuel tank to the alcohol concentration sensor after the internal combustion engine is started. Thus, it is possible to determine whether the alcohol concentration sensor malfunctions in a manner such that the operation of the internal combustion engine is not adversely affected.

The control apparatus according to the above-described aspect may further include a switching device that switches a fuel tank connected to the alcohol concentration sensor between the first fuel tank and the second fuel tank. The switching device may temporarily switch the fuel tank connected to the alcohol concentration sensor from the first fuel tank to the second fuel tank, and may switch the fuel tank connected to the alcohol concentration sensor to the first fuel tank after the malfunction determination portion finishes determining whether the alcohol concentration sensor malfunctions.

The control apparatus according to the above-described aspect may further include a correction portion that corrects the value detected by the alcohol concentration sensor to a value corresponding to the concentration of the alcohol in the second fuel, if the value detected by the alcohol concentration sensor is in the predetermined range when the fuel that flows through the supply passage is switched to the second fuel.

In the above-described configuration, if the value detected by the alcohol concentration sensor is in the predetermined range corresponding to the concentration of the alcohol in the second fuel when the fuel that flows through the supply passage is switched to the second fuel, that is, if it is determined that the alcohol concentration sensor normally functions, it is possible to correct the value detected by the alcohol concentration sensor by comparing the value detected by the alcohol concentration sensor with the value corresponding to the concentration of the alcohol in the second fuel. Therefore, it is possible to accurately detect the concentration of the alcohol in the fuel. Accordingly, it is possible to more accurately control the operation of the internal combustion engine.

In the above-described aspect, the correction portion may correct the value detected by the alcohol concentration sensor using a correction value that is set to a difference between the value detected by the alcohol concentration sensor and the value corresponding to the concentration of the alcohol in the second fuel.

In the above-described aspect, the second fuel stored in the second fuel tank may be gasoline.

A second aspect of the invention relates to a method for controlling an internal combustion engine, wherein a fuel tank connected to an alcohol concentration sensor is switched between a first fuel tank in which a first fuel containing alcohol is stored, and a second fuel tank in which a second fuel is stored; a concentration of alcohol in the second fuel is known; and the internal combustion engine is controlled based on a concentration of the alcohol in the first fuel detected by the alcohol concentration sensor. The method comprising switching the fuel tank connected to the alcohol concentration sensor to the second fuel tank; determining whether the alcohol concentration sensor malfunctions, by determining whether a value detected by the alcohol concentration sensor is in a predetermined range corresponding to the concentration of the alcohol in the second fuel; and switching the fuel tank connected to alcohol concentration sensor to the first fuel tank. It is determined that the alcohol concentration sensor malfunctions, if it is determined that the value detected by the alcohol concentration sensor is not in the predetermined range.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3 is a flowchart showing steps of a malfunction determination routine for an alcohol concentration sensor in the embodiment;

FIG. 4 is a flowchart showing steps of a correction routine for correcting a value detected by the alcohol concentration sensor in the embodiment;

DETAILED DESCRIPTION OF EMBODIMENTS

Figure 1:
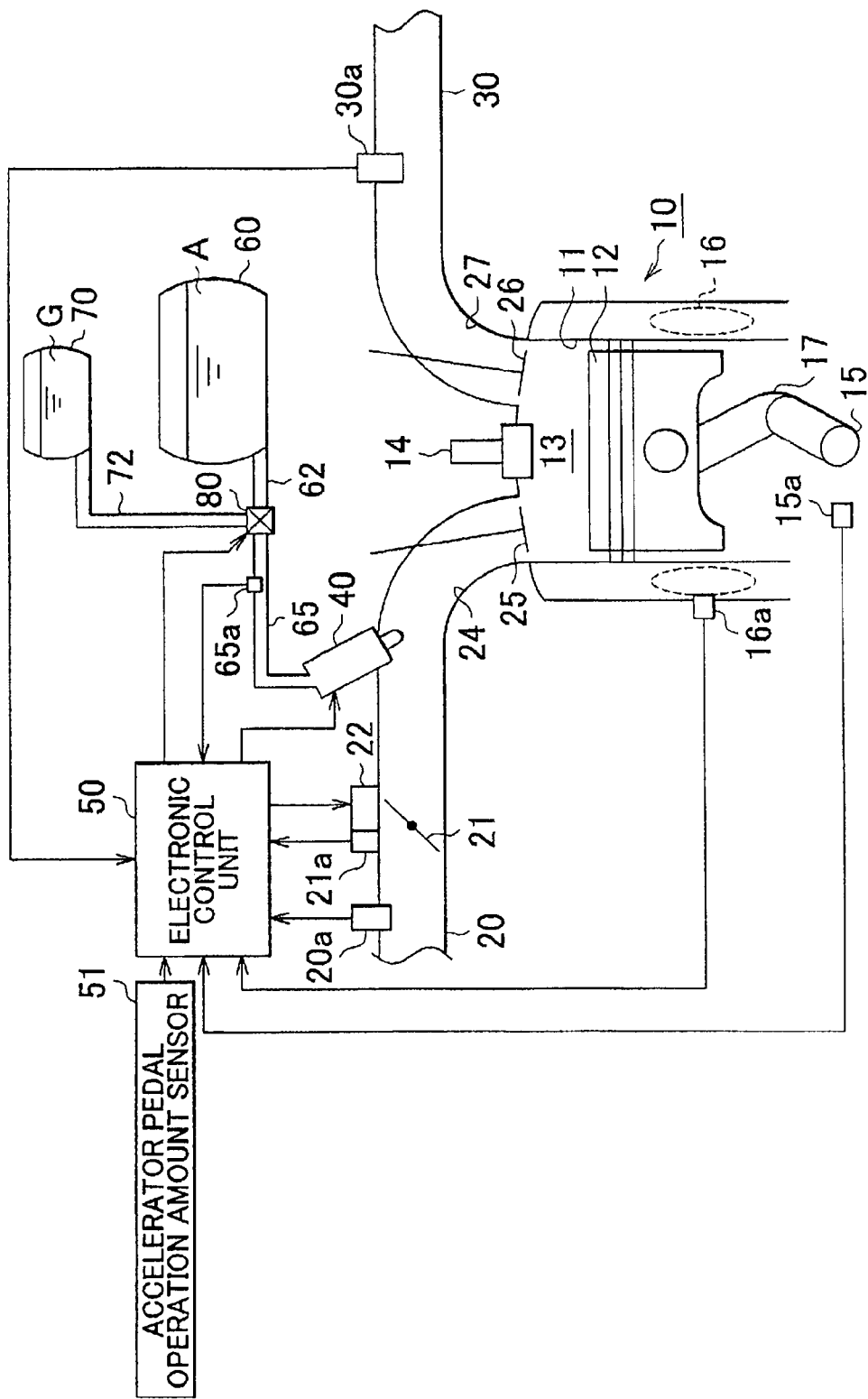
FIG. 1 is a schematic configuration diagram showing a control apparatus for an internal combustion engine according to an embodiment of the invention, and a configuration around the internal combustion engine.

Hereinafter, a control apparatus for an internal combustion engine according to an embodiment of the invention will be described with reference to FIG. 1 to FIG. 5. FIG. 1 shows an internal combustion engine 10 and a configuration around the internal combustion engine 10 in the embodiment. As shown in FIG. 1, a piston 12 is housed in each cylinder 11 of the internal combustion engine 10 in a manner such that the piston 12 reciprocates. The piston 12 is connected to a crankshaft 15 through a connecting rod 17. A crank position sensor 15a, which detects the rotational phase of the crankshaft 15, is provided for the crankshaft 15. Further, a water jacket 16 is provided in the internal combustion engine 10. A coolant, which cools the internal combustion engine 10, flows in the water jacket 16. Also, a coolant temperature sensor 16a, which detects the temperature of the coolant flowing in the water jacket 16, is fitted to the internal combustion engine 10.

An intake camshaft (not shown) and an exhaust camshaft (not shown) are rotated due to the rotation of the crankshaft 15. An intake valve 25 is pressed downward due to the rotation of the intake camshaft, and thus, communication is provided between an intake port 24 and a combustion chamber 13. An exhaust valve 26 is pressed downward due to the rotation of the exhaust camshaft, and thus, communication is provided between an exhaust port 27 and the combustion chamber 13. An ignition plug 14 is provided to face the combustion chamber 13.

An intake passage 20 is connected to the combustion chamber 13 in each cylinder 11 through the intake port 24. An exhaust passage 30 is connected to the combustion chamber 13 through the exhaust port 27. An air-fuel ratio sensor 30a is fitted to the exhaust passage 30. The air-fuel ratio sensor 30a detects a value corresponding to the concentrations of oxygen and unburned fuel in exhaust gas that flows in the exhaust passage 30.

In the intake passage 20, a throttle valve 21 and an actuator 22 are provided. The throttle valve 21 adjusts the flow rate of intake air that flows in the intake passage 20. The actuator 22 opens/closes the throttle valve 21. A throttle valve opening amount sensor 21a, which detects the opening amount of the throttle valve 21, is provided for the throttle valve 21. In the intake passage 20, an airflow meter 20a is provided upstream of the throttle valve 21. The airflow meter 20a detects the amount of intake air that flows in the intake passage 20.

Further, a port injector 40 is provided for the intake port 24 connected to the intake passage 20. The port injector 40 injects a fuel into the intake port 24. The port injector 40 is fitted to a cylinder head, and connected to fuel tanks through a supply passage 65. More specifically, a first supply passage 62 and a second supply passage 72 extend from the supply passage 65 connected to the port injector 40. The first supply passage 62 is connected to a first fuel tank 60 in which a mixed fuel A is stored. The mixed fuel A is produced by mixing alcohol with gasoline, and may be regarded as the first fuel. The second supply passage 72 is connected to a second fuel tank 70 in which a gasoline fuel G is stored. The gasoline fuel G may be regarded as the second fuel.

A switching valve 80 is provided at a connection portion at which the supply passage 65 is connected to the first supply passage 62 and the second supply passage 72. The switching valve 80 switches a supply passage connected to the supply passage 65 between the first supply passage 65 and the second supply passage 72. The switching valve 80 may be regarded as the switching device. Further, in the supply passage 65, an alcohol concentration sensor 65a is provided downstream of the switching valve 80. The alcohol concentration sensor 65a detects the concentration of alcohol in the fuel that flows through the supply passage 65.

More specifically, the fuel in the first fuel tank 60 or the second fuel tank 70, which is connected to the supply passage 65 by the switching valve 80, is delivered into the supply passage 65 by a fuel pump (not shown). Then, the fuel is supplied to the port injector 40 through the supply passage 65 and the alcohol concentration sensor 65a. The fuel injected into the intake port 24 from the port injector 40 is mixed with intake air that flows in the intake port 24. Thus, an air-fuel mixture is produced, and the air-fuel mixture flows into the combustion chamber 13.

In addition to the above-described sensors, other sensors, which are used to determine the operating state of the internal combustion engine 10, are provided for the internal combustion engine 10. For example, an accelerator pedal operation amount sensor 51, which detects the operation amount of an accelerator pedal, is provided. Signals output from the sensors are input to an electronic control unit 50 that controls devices of the internal combustion engine 10.

The electronic control unit 50 includes, for example, a calculation device, a drive circuit, and a storage device that stores, for example, the results of calculations in controls, and function maps used for the calculations. The electronic control unit 50 determines the operating state of the internal combustion engine 10 based on the signals output from the sensors. In addition, the electronic control unit 50 executes, for example, a fuel injection amount control and a fuel injection timing control for the port injector 40, an ignition timing control for the ignition plug 14, and an operation amount control for the actuator 22 that opens/closes the throttle valve 21. In the embodiment, an air-fuel ratio feedback control, which is one example of the fuel injection amount control, is executed. In the air-fuel ratio feedback control, the air-fuel ratio of the air-fuel mixture in the combustion chamber 13 is adjusted so that the air-fuel ratio approaches a target air-fuel ratio set according to the operating state of the internal combustion engine 10, by controlling the fuel injection amount based on the signals from the sensors including the airflow meter 20a and the alcohol concentration sensor 65a. That is, the fuel injection amount is controlled based on the concentration of the alcohol in the mixed fuel A, which is detected by the alcohol concentration sensor 65a when the first fuel tank 60 is connected to the supply passage 65 by the switching valve 80, and the mixed fuel A stored in the first fuel tank 60 is supplied to the port injector 40 through the alcohol concentration sensor 65a.

Figure 2:
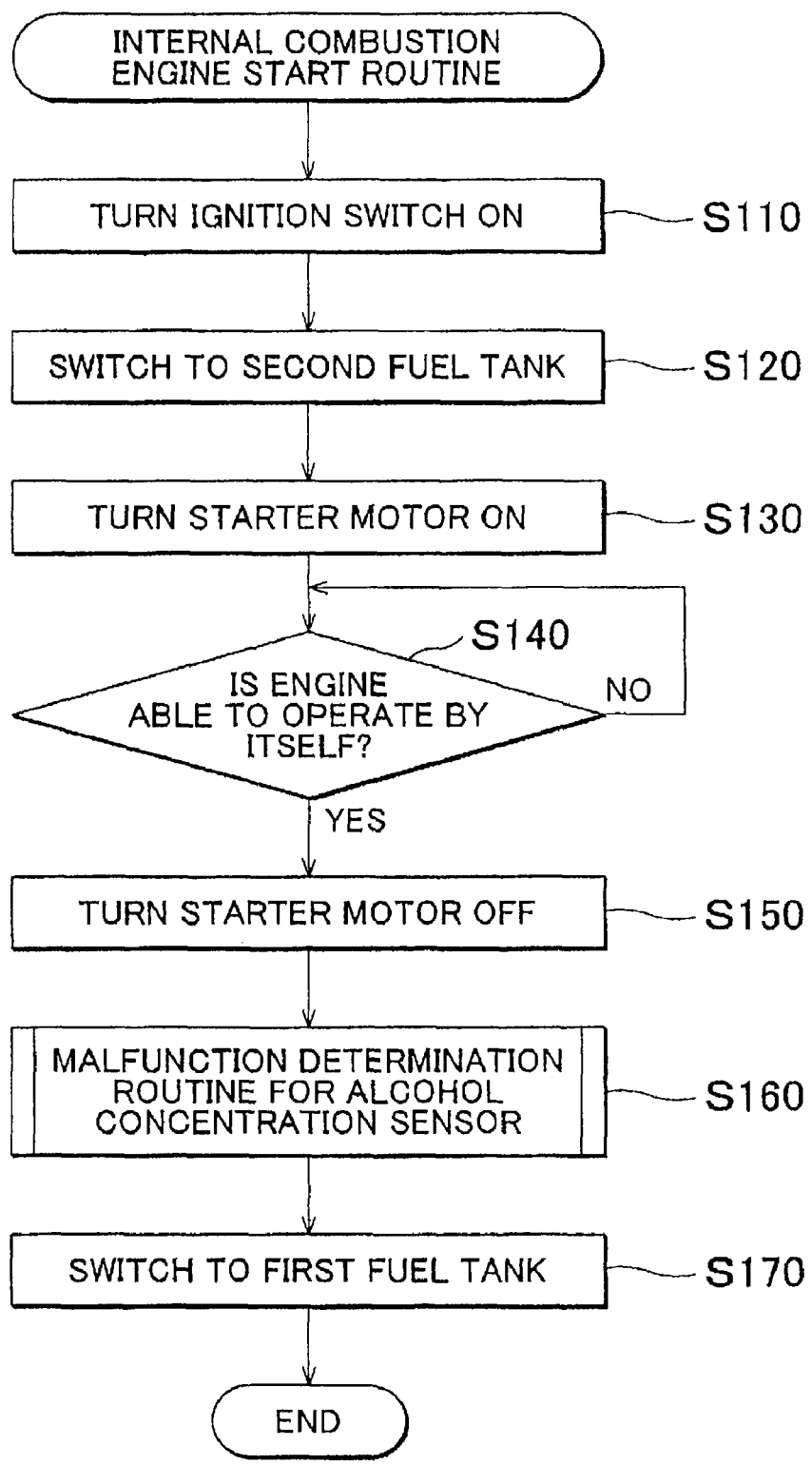
FIG. 2 is a flowchart showing steps of a start routine for starting the internal combustion engine in the embodiment.

Also, the electronic control unit 50 executes a start routine for starting the internal combustion engine 10 as shown in FIG. 2. As shown in FIG. 2, in the case where the start routine for starting the internal combustion engine 10 is executed, when a driver turns an ignition switch on (step S110), the fuel tank connected to the supply passage 65 is switched to the second fuel tank 70 (step S120). More specifically, the supply passage connected to the supply passage 65 is switched to the second supply passage 72 by the switching valve 80.

Then, a starter motor is operated (that is, the starter motor is turned on) according to a starting operation performed by the driver, and thus, a process of starting the internal combustion engine 10 is started (step S130). When the internal combustion engine 10 is started, only the gasoline fuel G stored in the second fuel tank 70 is drawn. The gasoline fuel G, which is drawn, flows through the second supply passage 72 and the supply passage 65. Thus, the gasoline fuel G is delivered under pressure to the port injector 40 through the alcohol concentration sensor 65a. Then, the gasoline fuel G is injected into the intake port 24 from the port injector 40.

Subsequently, in the routine shown in FIG. 2, it is determined whether the internal combustion engine 10 is able to operate by itself (step S140). It is determined whether the internal combustion engine 10 is able to operate by itself, based on the rotational speed of the crankshaft 15 calculated based on the value detected by the crank position sensor 15a. The phrase "the internal combustion engine 10 is able to operate by itself" signifies that the internal combustion engine 10 is able to operate independently (that is, the internal combustion engine 10 is able to operate without requiring assistance of the starter motor). In the routine shown in FIG. 2, when the rotational speed is lower than a predetermined value, it is determined that the internal combustion engine 10 is not able to operate by itself (NO in step S140). Therefore, the gasoline fuel G in the second fuel tank 70 continues to be supplied to the port injector 40 until it is determined that the internal combustion engine 10 is able to operate by itself.

When the rotational speed of the crankshaft 15 is equal to or higher than the predetermined value, it is determined that the internal combustion engine 10 is able to operate by itself (YES in step S140), and thus, the operation of the starter motor is stopped (that is, the starter motor is turned off) (step S150). Then, the routine proceeds to a malfunction determination routine for the alcohol concentration sensor 65a (step S160). FIG. 3 is a flowchart showing steps of the malfunction determination routine for the alcohol concentration sensor 65a.

As shown in FIG. 3, in the malfunction determination routine that may be regarded as the routine executed by the malfunction determination portion that determines whether the alcohol concentration sensor 65a malfunctions, first, the electronic control unit 50 obtains the value detected by the alcohol concentration sensor 65a (step S210). Then, it is determined whether the detected value is in a predetermined range (step S220). The predetermined range is set based on a value corresponding to the concentration of the alcohol in the fuel stored in the second fuel tank 70, taking into account a predetermined error or the like. More specifically, in the embodiment, the predetermined range is set by setting an upper limit value that is higher than the value corresponding to the concentration of the alcohol in the gasoline fuel G by a predetermined amount, and setting a lower limit value that is lower than the value corresponding to the concentration of the alcohol in the gasoline fuel G by the predetermined amount.

When it is determined that the value detected by the alcohol concentration sensor 65a is outside the predetermined range, that is, the detected value is higher than the upper limit value, or lower than the lower limit value (NO in step S220), it is determined that the alcohol concentration sensor 65a malfunctions (step S230). Then, the routine ends.

When it is determined that the value detected by the alcohol concentration sensor 65a is in the predetermined range, that is, it is determined that the detected value is equal to or higher than the lower limit value, and equal to or lower than the upper limit value (YES in step S220), it is determined that the alcohol concentration sensor 65*a* normally functions (step S240). Then, the routine proceeds to a detected value correction routine for correcting the value detected by the alcohol concentration sensor 65*a* (step S250). FIG. 4 is a flowchart showing steps of the detected value correction routine.

Figure 5:
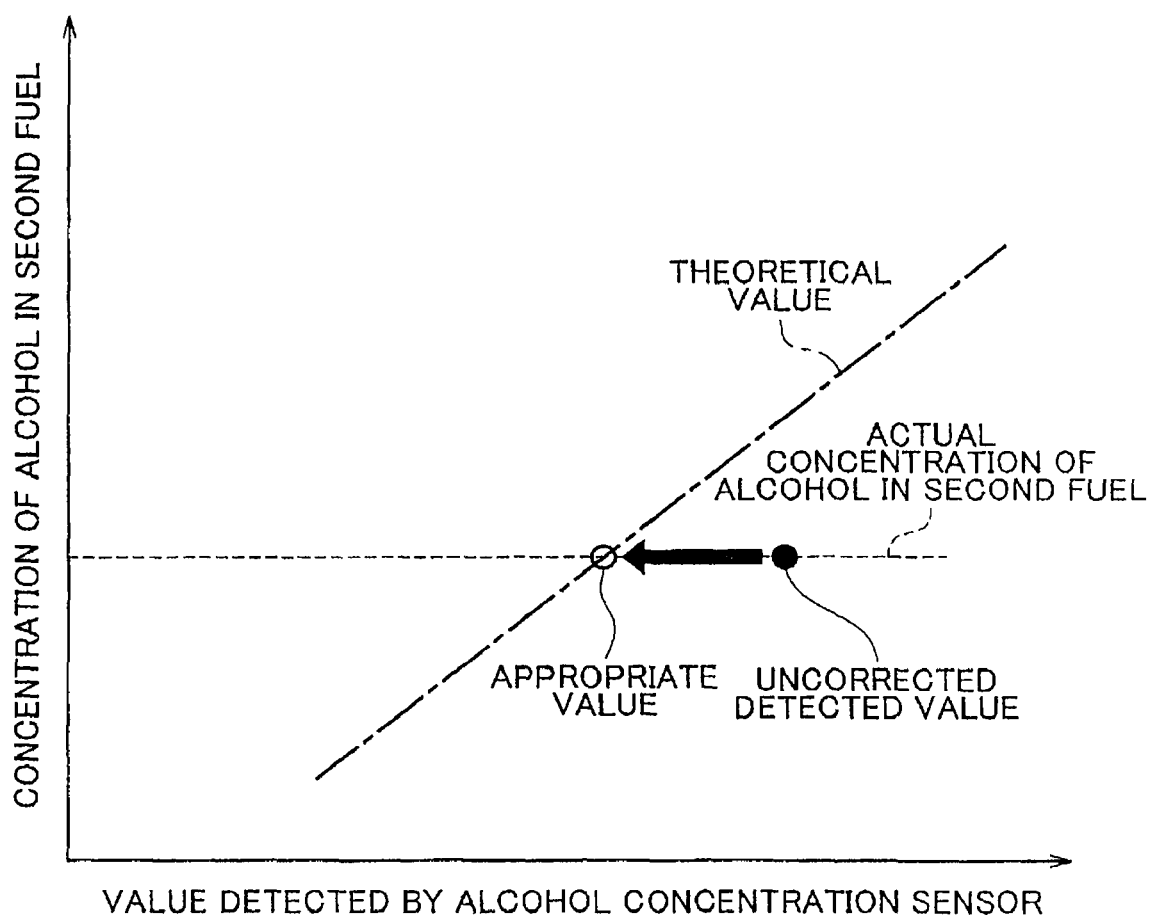
FIG. 5 is a graph showing a relation between the value detected by the alcohol concentration sensor and the concentration of alcohol in a second fuel in the embodiment.

As shown in FIG. 4, in the correction routine that may be regarded as the routine executed by the correction portion that corrects the value detected by the alcohol concentration sensor 65*a*, first, the electronic control unit 50 calculates a difference between the detected value and an appropriate value corresponding to the concentration of the alcohol in the fuel stored in the second fuel tank 70 (step S310). More specifically, the difference is calculated using a relation between the concentration of the alcohol in the fuel stored in the second fuel tank 70 and the value detected by the alcohol concentration sensor 65*a* shown in FIG. 5. In FIG. 5, the chain line shows, as a theoretical value, the appropriate value corresponding to each concentration of the alcohol in the fuel stored in the second fuel tank 70, that is, the appropriate value that should be detected by the alcohol concentration sensor 65*a*. The appropriate value corresponding to the actual concentration of the alcohol in the gasoline fuel G stored in the second fuel tank 70 (shown by the dashed line) is set based on the theoretical value. Then, the difference between the value detected by the alcohol concentration sensor 65*a*, which is not corrected, and the appropriate value is calculated by comparing the uncorrected detected value and the appropriate value.

Then, as shown in FIG. 4, a correction value is set to the calculated difference (step S320). More specifically, the correction value, which is used to correct the value detected by the alcohol concentration sensor 65*a* to the appropriate value, is set to the calculated difference. The electronic control unit 50 corrects the value detected by the alcohol concentration sensor 65 using the calculated correction value. The electronic control unit 50 uses the corrected detected value for other controls. Thus, the detected value correction routine and the malfunction determination routine (FIG. 3) for the alcohol concentration sensor 65*a* end. Further, in the start routine for starting the internal combustion engine 10 shown in FIG. 2, the fuel tank connected to the supply passage 65 is switched to the first fuel tank 60 (step S170). Thus, after the internal combustion engine 10 is started, only the mixed fuel A stored in the first fuel tank is drawn. That is, the mixed fuel A, which is drawn, flows through the first supply passage 62 and the supply passage 65, and thus, the mixed fuel A is delivered under pressure to the port injector 40 through the alcohol concentration sensor 65*a*. Then, the mixed fuel A is injected into the intake port 24 from the port injector 40.

According to the embodiment thus described, it is possible to obtain the following advantageous effects. (1) The concentration of the alcohol in the gasoline fuel G stored in the second fuel tank 70, which may be regarded as the second fuel, is known. The malfunction determination portion determines that the alcohol concentration sensor 65*a* malfunctions, if the value detected by the alcohol concentration sensor 65 is outside the predetermined range corresponding to the concentration of the alcohol in the gasoline fuel G when the fuel that flows through the supply passage 65 is switched to the gasoline fuel G. Therefore, it is possible to determine whether the alcohol concentration sensor 65*a* malfunctions, directly based on the value detected by the alcohol concentration sensor 65*a* Accordingly, it is possible to more accurately determine whether the alcohol concentration sensor 65*a* malfunctions.

(2) When the fuel tank connected to the alcohol concentration sensor 65*a* is switched to the second fuel tank 70 at the time of start of the internal combustion engine 10, it is determined whether the alcohol concentration sensor 65*a* malfunctions. Therefore, it is possible to determine whether the alcohol concentration sensor 65*a* malfunctions, without the need of connecting the second fuel tank 70 to the alcohol concentration sensor 65*a* after the internal combustion engine 10 is started. Thus, it is possible to determine whether the alcohol concentration sensor 65*a* malfunctions in a manner such that the operation of the internal combustion engine 10 is not adversely affected.

(3) If the value detected by the alcohol concentration sensor 65*a* is in the predetermined range corresponding to the concentration of the alcohol in the gasoline fuel G when the fuel that flows through the supply passage 65 is switched to the gasoline fuel G, that is, if it is determined that the alcohol concentration sensor 65*a* normally functions, it is possible to correct the value detected by the alcohol concentration sensor 65*a* by comparing the value detected by the alcohol concentration sensor 65*a* with the appropriate value corresponding to the concentration of the alcohol in the gasoline fuel G. Therefore, it is possible to accurately detect the concentration of the alcohol in the fuel. Accordingly, it is possible to more accurately control the operation of the internal combustion engine 10.

Modifications may be appropriately made to the above-described embodiment. In the above-described embodiment, the value detected by the alcohol concentration sensor 65*a*, which is not corrected, is compared with the appropriate value corresponding to the actual concentration of the alcohol in the gasoline fuel G stored in the second fuel tank 70, and the correction value is set to the difference between the uncorrected detected value and the appropriate value corresponding to the actual concentration of the alcohol in the gasoline fuel G. However, the correction value may be set to a ratio of the appropriate value to the uncorrected detected value, and the value detected by the alcohol concentration sensor 65*a* may be corrected by multiplying the detected value by the correction value.

In the above-described embodiment, in the start routine for starting the internal combustion engine 10, the malfunction determination routine for determining whether the alcohol concentration sensor 65*a* malfunctions is executed after the internal combustion engine 10 becomes able to operate by itself. However, the malfunction determination routine may be executed before the internal combustion engine 10 becomes able to operate by itself.

Figure 6:
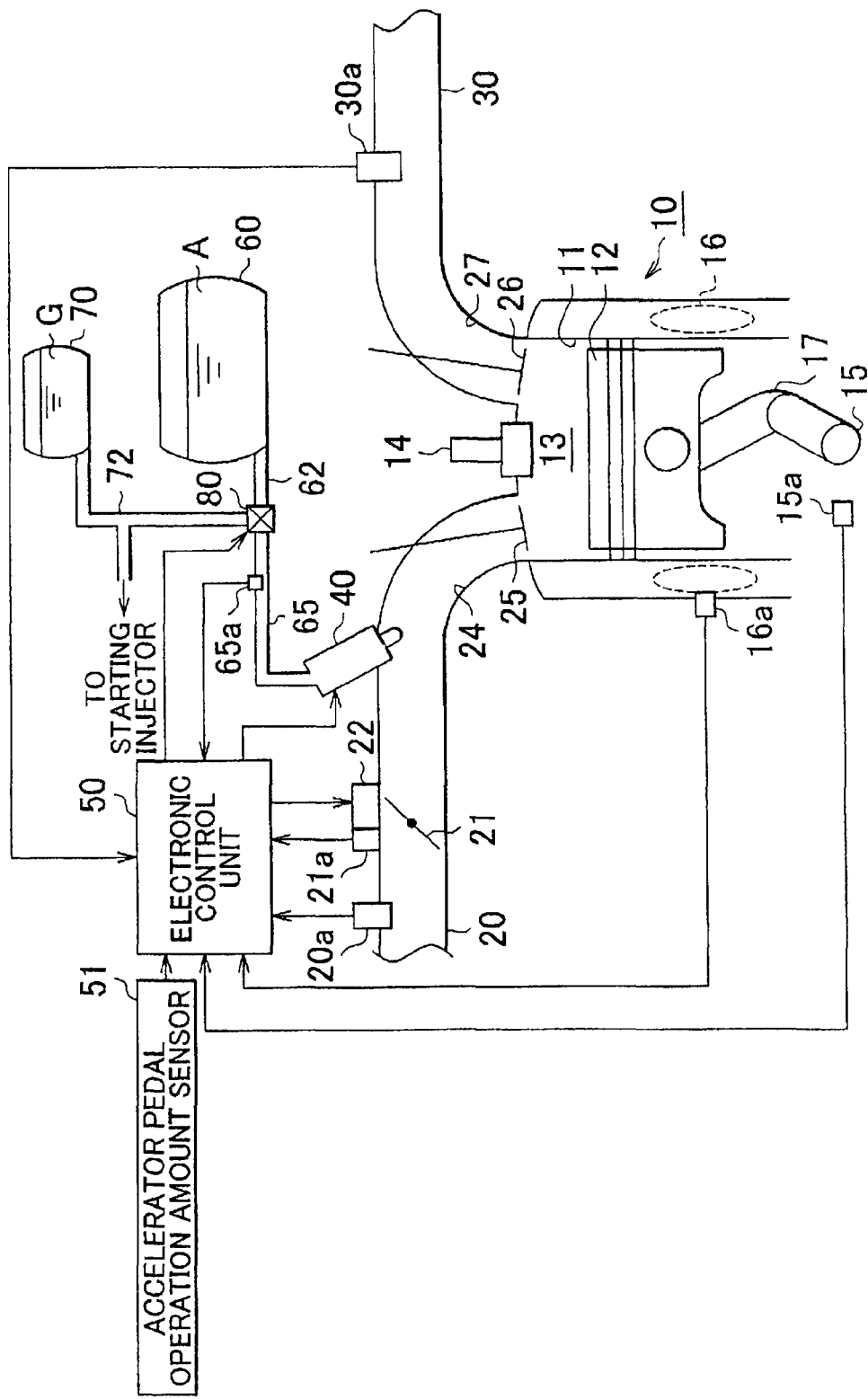
FIG. 6 is a schematic configuration diagram showing an internal combustion engine and a configuration around the internal combustion engine in a modified example of the embodiment of the invention.
Figure 7:
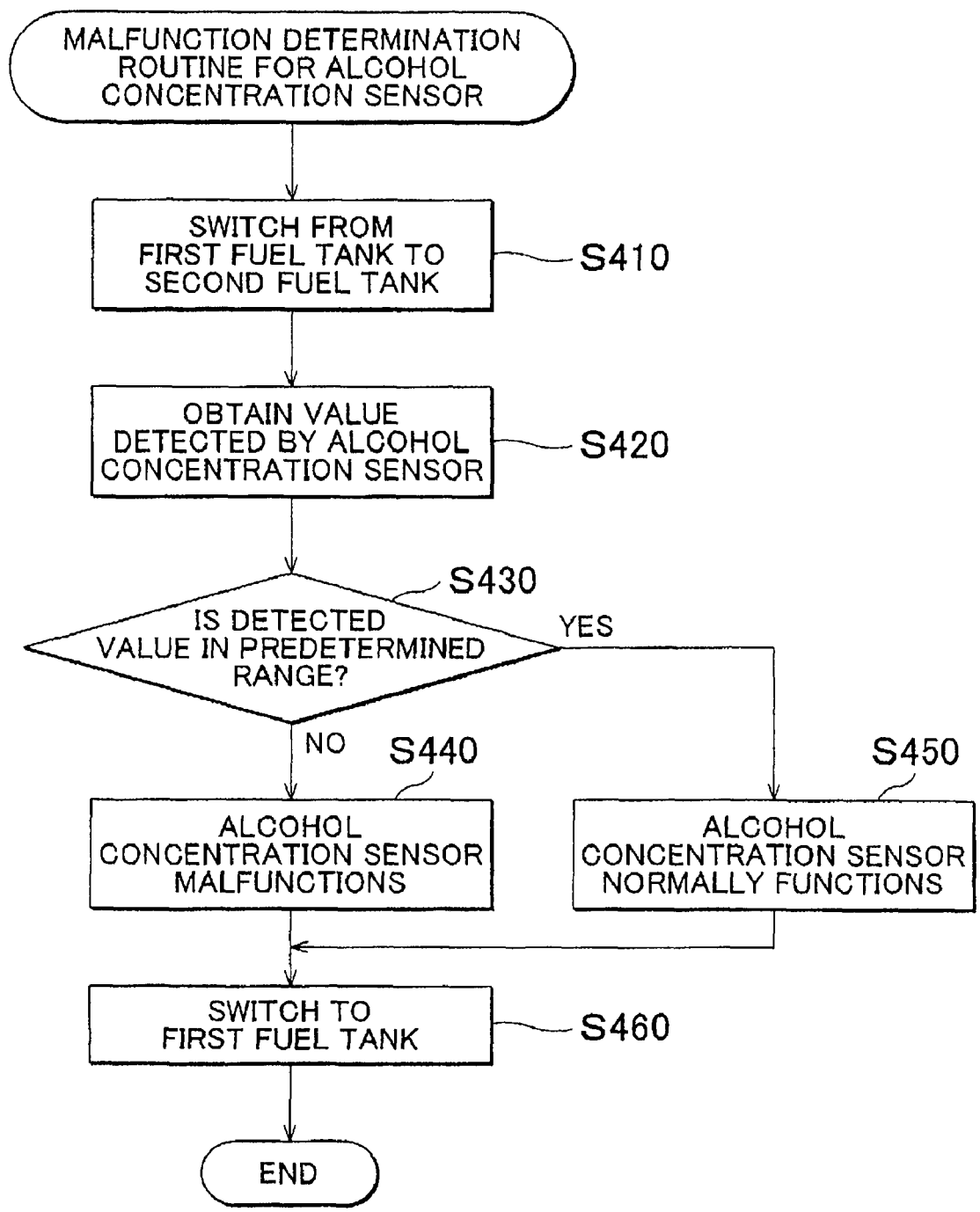
FIG. 7 is a flowchart showing steps of a malfunction determination routine for an alcohol concentration sensor in the modified example of the embodiment of the invention.

FIG. 6 shows a modified example of the above-described embodiment. As shown in FIG. 6, in the modified example of the above-described embodiment, the second supply passage 72 is connected to the second fuel tank 70 in which the gasoline fuel G, which may be regarded as the second fuel, is stored, and two passages extend from the second supply passage 72. One of the two passages is connected to the port injector 40 through the switching valve 80, the supply passage 65, and the alcohol concentration sensor 65*a*. The other passage is connected to a starting injector. Both of the first fuel tank 60 and the second fuel tank 70 are connected to the port injector 40. When the malfunction determination process is executed, the fuel tank connected to the port injector 40 is temporarily switched from the first fuel tank 60 to the second fuel tank 70. FIG. 7 is a flowchart showing steps of the malfunction determination routine for the alcohol concentration sensor 65*a*. As shown in FIG. 7, in the routine, the electronic control unit 50 (FIG. 6) switches the fuel tank connected to the port injector 40 from the first fuel tank 60 to the second fuel tank 70 using the switching valve 80 (step S410). Thus, the gasoline fuel G stored in the second fuel tank 70 flows into the port injector 40 through the second supply passage 72, the switching valve 80, the supply passage 65, and the alcohol concentration sensor 65a. Then, in the malfunction determination routine in the modified example, the value detected by the alcohol concentration sensor 65a is obtained (step S420), and it is determined whether the detected value is in the predetermined range (step S430), as in the malfunction determination routine in the above-described embodiment. Further, if it is determined that the value detected by the alcohol concentration sensor 65a is outside the predetermined range (NO in step S430), it is determined that the alcohol concentration sensor 65a malfunctions (step S440). In contrast, if it is determined that the value detected by the alcohol concentration sensor 65a is in the predetermined range, (YES in step S430), it is determined that the alcohol concentration sensor 65a normally functions (step S450). After it is determined that the alcohol concentration sensor 65a malfunctions in step 440 or it is determined that the alcohol concentration sensor 65a normally functions in step S450, the fuel tank connected to the port injector 40 is switched to the first fuel tank 60 using the switching valve 80 (step S460). Then, the routine ends. In this modified example as well, it is possible to obtain the advantageous effect (1) as in the above-described embodiment. The malfunction determination routine for the alcohol concentration sensor 65a may be executed as an interrupt routine at predetermined intervals.

In the above-described embodiment, in the start routine for starting the internal combustion engine 10, when the fuel tank connected to the alcohol concentration sensor 65a is switched to the second fuel tank 70 at the time of start of the internal combustion engine 10, the malfunction determination routine for the alcohol concentration sensor 65a is executed. However, after the start routine for starting the internal combustion engine is finished, the fuel tank connected to the alcohol concentration sensor may be temporarily switched from the first fuel tank to the second fuel tank, and the malfunction determination routine for the alcohol concentration sensor may be executed. The fuel tank connected to the alcohol concentration sensor may be switched to the second fuel tank in other routines, or the fuel tank connected to the alcohol concentration sensor may be switched to the second fuel tank to execute the malfunction determination routine.

In the above-described embodiment, in the correction routine for correcting the value detected by the alcohol concentration sensor 65a, the value detected by the alcohol concentration sensor 65a is corrected by comparing the detected value with the appropriate value corresponding to the actual concentration of the alcohol in the gasoline fuel G stored in the second fuel tank 70. However, the concentration of the alcohol calculated based on the value detected by the alcohol concentration sensor may be compared with the actual concentration of the alcohol to set a correction value used to correct the calculated concentration of the alcohol, and the calculated concentration of the alcohol may be corrected using the correction value.

In the above-described embodiment, the gasoline fuel G, which may be regarded as the second fuel, is stored in the second fuel tank 70. However, mixed fuel produced by mixing alcohol with gasoline may be stored in the second fuel tank, or alcohol fuel that does not contain gasoline may be stored in the second fuel tank. In other words, any fuel may be stored in the second fuel tank, as long as the concentration of the alcohol in the fuel is known.

In the above-described embodiment, the first fuel tank and the second fuel tank are connected to the port injector. However, the first fuel tank and the second fuel tank may be connected to a cylinder injector.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A control apparatus for an internal combustion engine, comprising:
    a first fuel tank in which a first fuel containing alcohol is stored;
    a second fuel tank in which a second fuel is stored, wherein a concentration of alcohol in the second fuel is known;
    an alcohol concentration sensor disposed in a supply passage through which the first fuel and the second fuel flow, wherein the control apparatus switches a fuel that flows through the supply passage between the first fuel and the second fuel, and controls the internal combustion engine based on a concentration of the alcohol in the first fuel detected by the alcohol concentration sensor; and
    a malfunction determination portion that determines that the alcohol concentration sensor malfunctions, if a value detected by the alcohol concentration sensor is outside a predetermined range corresponding to the concentration of the alcohol in the second fuel when the fuel that flows through the supply passage is switched to the second fuel.

2. The control apparatus according to claim 1, wherein the control apparatus controls a fuel injection amount based on the concentration of the alcohol in the first fuel detected by the alcohol concentration sensor.

3. The control apparatus according to claim 2, further comprising
    a switching device that switches a fuel tank connected to the alcohol concentration sensor between the first fuel tank and the second fuel tank, wherein
    the switching device switches the fuel tank connected to the alcohol concentration sensor to the second fuel tank when the internal combustion engine is started, and the switching device switches the fuel tank connected to the alcohol concentration sensor to the first fuel tank after the internal combustion engine is started.

4. The control apparatus according to claim 2, further comprising
    a switching device that switches a fuel tank connected to the alcohol concentration sensor between the first fuel tank and the second fuel tank, wherein
    the switching device temporarily switches the fuel tank connected to the alcohol concentration sensor from the first fuel tank to the second fuel tank, and switches the fuel tank connected to the alcohol concentration sensor to the first fuel tank after the malfunction determination portion finishes determining whether the alcohol concentration sensor malfunctions.

5. The control apparatus according to claim 2, further comprising
    a correction portion that corrects the value detected by the alcohol concentration sensor to a value corresponding to the concentration of the alcohol in the second fuel, if the value detected by the alcohol concentration sensor is in the predetermined range when the fuel that flows through the supply passage is switched to the second fuel.

6. The control apparatus according to claim 5, wherein the correction portion corrects the value detected by the alcohol concentration sensor using a correction value that is set to a difference between the value detected by the alcohol concentration sensor and the value corresponding to the concentration of the alcohol in the second fuel.

7. The control apparatus according to claim 2, wherein the second fuel stored in the second fuel tank is gasoline.

8. A method for controlling an internal combustion engine, wherein a fuel tank connected to an alcohol concentration sensor is switched between a first fuel tank in which a first fuel containing alcohol is stored, and a second fuel tank in which a second fuel is stored; a concentration of alcohol in the second fuel is known; and the internal combustion engine is controlled based on a concentration of the alcohol in the first fuel detected by the alcohol concentration sensor, the method comprising:

switching the fuel tank connected to the alcohol concentration sensor to the second fuel tank;

determining whether the alcohol concentration sensor malfunctions, by determining whether a value detected by the alcohol concentration sensor is in a predetermined range corresponding to the concentration of the alcohol in the second fuel, wherein it is determined that the alcohol concentration sensor malfunctions, if it is determined that the value detected by the alcohol concentration sensor is not in the predetermined range; and switching the fuel tank connected to alcohol concentration sensor to the first fuel tank.

9. The method according to claim 8 wherein a fuel injection amount is controlled based on the concentration of the alcohol in the first fuel detected by then alcohol concentration sensor.

10. The method according to claim 9, wherein the fuel tank connected to the alcohol concentration sensor is switched to the second fuel tank when the internal combustion engine is started; and the fuel tank connected to the alcohol concentration sensor is switched to the first fuel tank after the internal combustion engine is started.

11. The method according to claim 9, wherein the fuel tank connected to the alcohol concentration sensor is temporarily switched from the first fuel tank to the second fuel tank.

12. The method according to claim 9, further comprising correcting the value detected by the alcohol concentration sensor to a value corresponding to the concentration of the alcohol in the second fuel, if it is determined that the value detected by the alcohol concentration sensor is in the predetermined range.

13. The method according to claim 12, wherein the value detected by the alcohol concentration sensor is corrected using a correction value that is set to a difference between the value detected by the alcohol concentration sensor and the value corresponding to the concentration of the alcohol in the second fuel.

14. The method according to claim 9, wherein the second fuel stored in the second fuel tank is gasoline.

* * * * *